(No Model.) 5 Sheets—Sheet 1.

J. R. SEVERANCE.
KNOT TYING MECHANISM FOR GRAIN BINDERS.

No. 382,773. Patented May 15, 1888.

Witnesses,
Geo. W. Young,
Henry A. Lamb.

Inventor,
James R. Severance.
By his Attorneys
James T. Kinkle.

(No Model.) 5 Sheets—Sheet 2.

J. R. SEVERANCE.
KNOT TYING MECHANISM FOR GRAIN BINDERS.

No. 382,773. Patented May 15, 1888.

Witnesses.
Geo. W. Young.
Henry A. Lamb.

Inventor,
James R. Severance.
By his Attorneys
James Skinkle (No Model.) 5 Sheets—Sheet 3.

J. R. SEVERANCE.
KNOT TYING MECHANISM FOR GRAIN BINDERS.

No. 382,773. Patented May 15, 1888.

Witnesses.
Geo. W. Young.
Henry A. Lamb.

Inventor,
James R. Severance,
By his Attorneys.
James T. Kinkle.

(No Model.) 5 Sheets—Sheet 5.

J. R. SEVERANCE.
KNOT TYING MECHANISM FOR GRAIN BINDERS.

No. 382,773. Patented May 15, 1888.

UNITED STATES PATENT OFFICE.

JAMES R. SEVERANCE, OF FREMONT, OHIO, ASSIGNOR OF TWO-THIRDS TO WILLIAM D. BALDWIN, OF MONTCLAIR, NEW JERSEY, AND JOHN C. ADSET, OF HORNELLSVILLE, NEW YORK.

KNOT-TYING MECHANISM FOR GRAIN-BINDERS.

SPECIFICATION forming part of Letters Patent No. 382,773, dated May 15, 1888.

Application filed February 20, 1886. Serial No. 192,646. (No model.)

*To all whom it may concern:*

Be it known that I, JAMES R. SEVERANCE, a citizen of the United States, residing at Fremont, in the county of Sandusky, State of Ohio, have invented certain new and useful Improvements in Knot-Tying Mechanism for Grain-Binders, of which the following is a description.

The present invention relates to knot-tying devices for self-binding harvesters; and it consists in improvements in the design, construction, and operation of the "double-spiral" knotter shown and described in Letters Patent No. 237,135, granted to me February 1, 1881, as will be hereinafter fully set forth in detail, and also in a novel construction of the cord-holder.

The object of my improvements herein described is, mainly, to contract the space occupied by the knotting machinery and adapt it for use in my new grain-binding harvester, in which the binder is placed inside of and close to the drive-wheel and the bundle is delivered by my vertically-vibrating forked discharger.

A further object is to simplify the knotting device, especially by providing a simple rotary cord-holder adapted to work in combination with a spiral knotter of the type here shown and to perform all the offices of the cord-holder and cord-controller of my former patent by one forward rotation for each knot.

A further object is to improve, generally, the construction and operation of the knotting device, all as hereinafter described and claimed.

In the accompanying drawings, Fig. 12 is an elevation, partly in section, giving a detail view of the rotating double-spiral cord-looping device and its actuating-cam, the cord-holding jaws at the extremity of the spiral being open and the spiral in its retracted position of rest. Fig. 13 is an end view thereof. Fig. 14 is a side elevation of the knotter-spirals and a portion of the cam, taken on the side opposite to that shown in Fig. 12. It shows the fixed block by which the spiral is caused to screw or move back and forth when rotated and the spiral in its most advanced position, with the jaws opened for the reception of the cord. Fig. 16 is a view in detail of one member of the double spiral and its hollow shank.

Similar letters denote like parts throughout.

The casing A, within which the knotting mechanism is contained and supported, is secured to the frame-work B B' of the binder in any convenient manner, the power necessary to produce its various movements being supplied through the binder-shaft A', which, by means of intervening connections, produces one operation of the knot-tying devices each time said shaft is revolved, which, by means of appropriate mechanism, is caused to occur whenever sufficient grain has accumulated to form a bundle of the desired size. Upon this shaft is mounted a driving wheel or disk, $a$, which is formed with gear-teeth $B^{21}$ on a portion of its periphery, the remainder of the periphery being plain and smooth, as at $A^2$. The first tooth of the series has an extension, $b$, on its inner side in the nature of a tappet, and a cam-track, $b'$, is formed between two ribs on the face of the disk. Two other disks, $B^2 B^3$, are likewise fixed to the driving-shaft and provided with segmental beveled gear-racks the teeth of which alternately mesh with the teeth of a bevel-pinion, $B^4$, lying between them and rotate it first in one direction and then in another. This pinion is provided with delay-shoes $A^3$, which bear against flanges $b^2 b^3$ on the disks and keep it from turning until driven positively in one direction and then in another by the gear-teeth thereon.

The rear end of the knotter-casing is supported by a bracket, $B^5$, provided with a journal, $a'$, within which rotates a shaft, $a^2$, carrying at one end the beveled pinion $B^4$ just described, and at the other a somewhat larger one, $a^3$, which latter meshes with a pinion, $a^4$, mounted upon the fixed axis $a^5$. This axis is suitably supported at its rear end by a bracket depending from the casing A, and at its forward end by a depending bracket, $e$, secured to or extending from the side of the casing and formed with the cord-guiding projection or deflector $e'$ and groove $e^2$, hereinafter referred to. The pinion $a^4$ is secured to the rear end of a shell-cam, C, to which intermittent rotary motion is imparted in alternating directions by the mechanism just described.

The knot-forming devices consist principally of the two parallel spiral arms D E, which in many respects are similar to those shown and described in my patent, No. 237,135, but differ therefrom in various particulars. In the present instance, instead of being hooked and grooved merely, the forward spiral, D, has an abrupt end, in which is formed a recess or groove that is parallel, or nearly so, with the axis of the spiral, and the spiral at its end is made somewhat wider than at other points, so as to form two points, $p'$, between which a projecting rib, $p^2$, extending from the front side of the other spiral is guided. The spiral E, in addition to the rib $p^2$, is formed with a hook, E', that fits into the recess D', between which and the side walls of said recess the cord is firmly held during the formation of a knot.

The spiral arms D E are of unequal length and are secured upon hollow shanks fitting one within the other, the two together being mounted upon the fixed axis $a^5$. The shorter spiral, E, carries the hook and is secured to the inner shank, $E^2$. The longer spiral, D, which is the forward or outer one, is provided with the recess at its extremity and secured to the exterior of the shank $D^2$, its convolutions extending the entire length thereof.

The shank $E^2$ is somewhat longer than the shank $D^2$, within which it lies, and it is provided at its rear end with a collar, F', upon which is placed a suitable stud and anti-friction roller, $f'$, a second pin and roller, $f$, being provided at or near the rear extremity of the shank $D^2$. A coiled spring, $D^3$, is secured to and connects the rear end of the shank $D^2$ to the collar F', and operates to force the members of the spiral in opposing directions, thereby holding the hook E' tightly in the recess D'.

Instead of extending rearward and increasing the length of the knotter, as in my previous patent before referred to, the shell-cam C projects forward and envelops the hollow shanks and the rear portions of the long spiral.

The cam C is formed with two tracks, G and G', cut longitudinally in its walls nearly on opposite sides thereof. The roller $f$, attached to the shank $D^2$, traveling in the track G, bears against the straight edge thereof in the position 1 2 in Fig. 23. The roller $f'$, actuating the shank $E^2$, travels on the track G'. The spiral D is formed with a stop, $d$, which is in the path of a projection, $d'$, that forms or may form a part of the fixed block $D^4$, the edges of which are of the same pitch as the spiral, and, being inserted between the convolutions thereof and suitably secured to the casing, compels it to move longitudinally along its axis $a^5$ in accordance with the direction of its rotation. When the cam is rotated in its first direction and the spiral is projected to its farthest position, the shoulder $d$ contacts with the block $d'$ and stops the further rotation or movement of the member D. The roller $f'$ being now in position 4, continued rotation of the cam will complete the movement of the spiral E and project the hook E' forward and out of the recess D', thus opening the jaws for the reception of the cord. When the movement of the cam is reversed, the jaws are first closed on the cord and then the spiral travels backward as a unit, and the cord being held in the cord-hook or clamping-jaws D' E' by the force of the spring $D^3$ until the rollers approach their final position, when, by continued rotation of the cam the roller $f'$ is forced up the inclined portion $g'$ of its track, reducing the speed of the hooked spiral E, while the roller $f$, lying against the straight side of the cam G, continues to retreat at the normal rate of speed, compressing the connecting-spring $D^3$ and causing the recessed spiral D to draw away from the hook, thus again opening the jaws to liberate the bight of the completed knot.

Figures 5, 6, 7, 8, 9, 10, 11, 23:
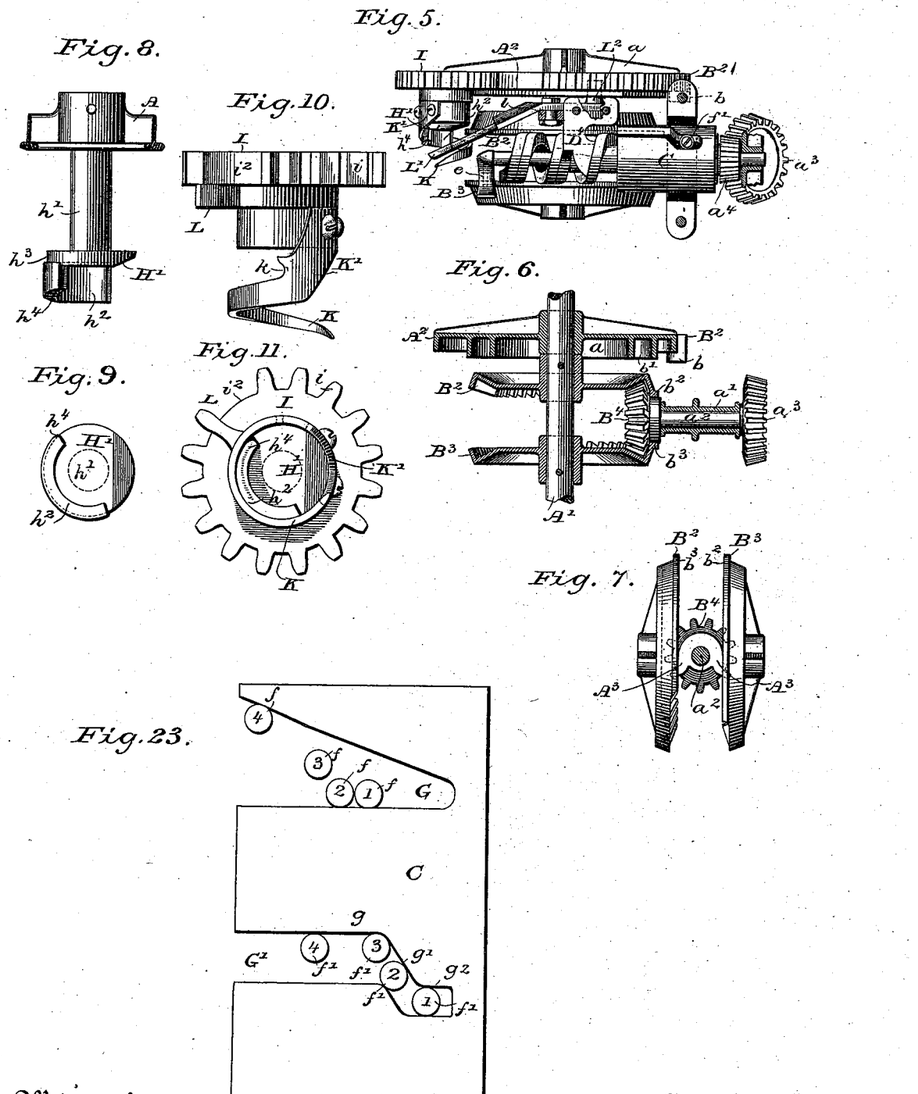
Fig. 5 is a plan view of the knotter and its actuating mechanism with the casing removed.
Fig. 6 is a plan view, partly in section, of the cam and gear wheels for actuating the knotter, mounted upon a portion of the main binder-shaft.
Fig. 7 is an end view of the pinion and mutilated gear-wheels for imparting alternately-reverse motion to the spiral cord-looping device.
Figs. 8, 9, 10, and 11 are enlarged details of the cord holding and guiding devices.
Fig. 23 is a diagrammatic view of the shell-cam by which the spiral is actuated, showing the tracks therein and the progressive positions of the anti-friction rollers upon the stud extending from the shanks of the spiral looper by which the two portions thereof are controlled.
Figures 15, 17, 18, 19, 20, 21, 22:
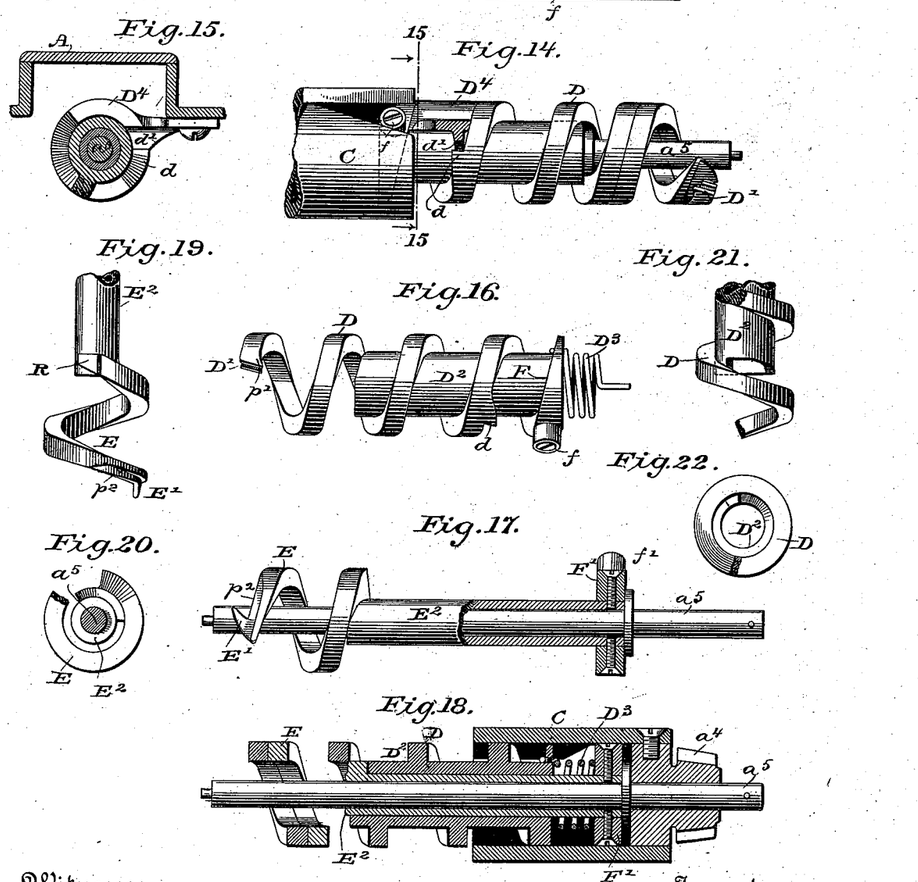
Fig. 15 is a section on the lines 15 15 of Fig. 14, a portion of the outer casing being shown in addition.
Fig. 17 is a similar view of the other member of the spiral, with its hollow shank and the supporting-shaft, the shank being shown partly in section.
Fig. 18 is a longitudinal sectional elevation showing the relative positions of the spirals with respect to each other and their supporting and actuating mechanism.
Figs. 19 and 20 are detail views of the shorter spiral.
Figs. 21 and 22 are details of the longer spiral to show the manner of connecting them to their tubular shanks.

In the diagrammatic view of the cam, Fig. 23, the successive working positions of the rollers are shown and numbered progressively 1 2 3 4.

It will be seen from examination of Fig. 10 of my former patent, No. 237,135, that the solid inner knotter-shank, M, must at times in the operation of the knotter extend back outside of the bearing by a distance equal to the extent of the longitudinal motion of the knotter. It will also be seen that the knotter-shafts are mounted in two bearings, $m\ m'$, each of which must be long enough to present adequate wearing-surface; and, further, the knotter-cam shell has two bearings upon the shanks of the knotter-spirals. By the improvement herein shown, in which the inner knotter-shank is made tubular and is mounted on a fixed axis, the backward extension of the shaft M is avoided; also, one of the bearings, $m$, is dispensed with and the other, $m'$, is shortened, since wearing-surface is not required, and by making the cam-shell a nearly complete cylinder and resting the front end of it upon one of the spirals the front bearing of the cam-shell can be omitted. This makes a very important and material reduction in the length of the knotter-shafts and their casing—an essential point in any favorable adaptation of this form of knotter for use in a low harvester-binder of the type above named. Again, inspection of Fig. 10 of my former patent shows the guide-block N arranged to act upon the free part of the spirals. By carrying one of the spirals back on the outside of its tubular shank a much firmer screw-thread is presented to be acted upon by the guide-block, (marked $D^4$ in the present case,) and by allowing this spiral threaded shank to be enveloped by the cam-shell this firmer construction is secured at the same time with the more compact form above explained.

Figure 1:
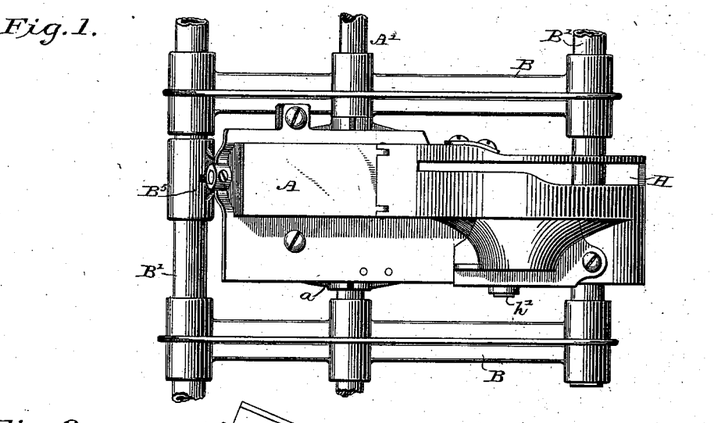
Figure 1 is a plan view showing the knotter and that portion of the binder-frame upon which it is supported.
Figure 2:
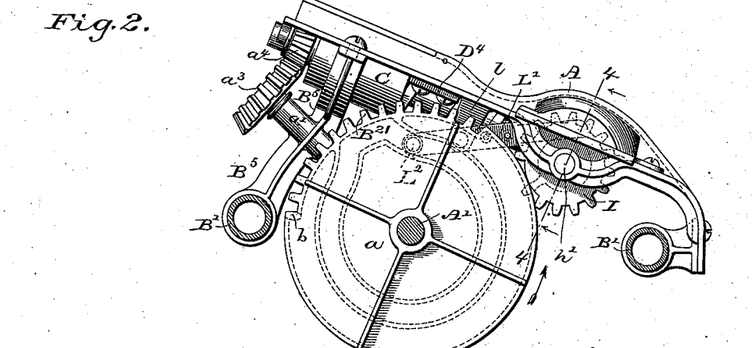
Fig. 2 is an elevation of the devices shown in Fig. 1.
Figure 3:
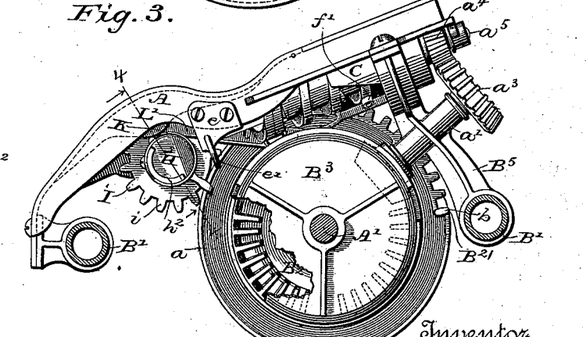
Fig. 3 is an elevation of the same from the opposite side.
Figure 4:
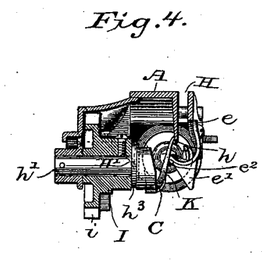
Fig. 4 is an end view of the knotting devices, showing the casing in section, on the line 4 4 of Figs. 2 and 3.

At the front portion of the knotter-casing is formed a longitudinal slot, H, for the reception of the needle-arm and the passage of the cord, the side next to the cord-holder being formed with a depending curved lip, $h$, Fig. 4, which serves as a guard for the point of the cord-holder and the knife.

My improved cord-holder consists of a fixed cylindrical segment, $h^2$, Figs. 8, 9, and 11, supported from the knotter-casing, around which segment rotates the curved clamping-plate K', provided with the projecting spiral horn K, adapted to hook over and engage the cord and draw it into position to be caught and clamped between the plate and the fixed segment.

Figure 33:
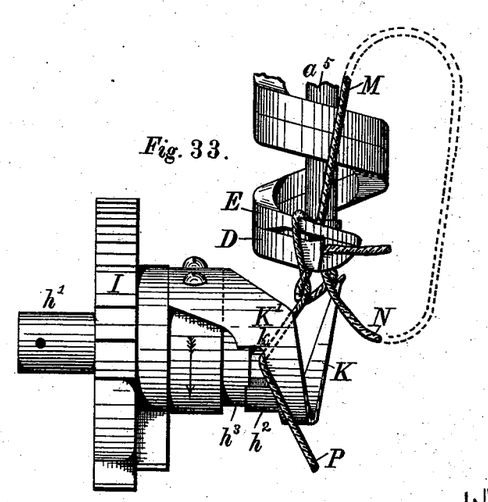
Fig. 33 is an enlarged plan view of the cord-holder and a portion of the knotter-spirals in the same position as in the side elevation, Fig. 29.

The construction of the device is as follows: In the side of the casing A is mounted a stud, $h'$, which is formed with a head, H', from one side of which extends a segmental flange, $h^2$. The flange $h^2$ is preferably beveled or sloped along its outer end, as at $h^4$, for the purpose of affording increased space for the passage of the cord along the inner surface of the spiral cord-hook K toward the angle $k$, and the segmental flange $h^2$ is formed with the recess or groove $h^3$ along its inner edge, for the purpose of preventing the accumulation between the flange and clamping-plate of pieces of cord or other substances which would clog and impede the operation of the device. The recess $h^3$ is formed by turning down the surface of the hub H' to a diameter smaller than that of the segmental clamping-surface $h^2$. One edge of the hub may be beveled off or cut away to afford greater space for the action of the vibrating knife. A pinion, I, rotates upon the stud $h'$ and carries a spiral cord-guiding horn, K, which terminates in a curved plate, K', which latter extends to and is secured upon the hub of the pinion I, which, when rotated, carries it past and in close proximity to the circumference of the flange $h^2$, forming between the inner surface of the plate K' and the circumference of the flange $h^2$ a cord-holder which operates to hold the cord whether the clamping-plate is moving or stationary. An obtuse rounded angle is formed at the junction of the horn K with the plate K', as indicated at $k$, Figs. 10 and 33. The pinion I is driven by the wheel or disk $a$ on the binder-shaft, and is provided with the gear-teeth $i$, meshing with the teeth $B^{21}$ on the periphery of the wheel $a$. The pinion is mutilated by the omission of two of its teeth, leaving a space, $i^2$, which embraces the smooth portion of the periphery of the disk $a$ during the period of non-rotation of the pinion and locks it against accidental rotation. A side spur, L, extends from the hub of the pinion in a position directly in line with the point from which one of the teeth has been omitted, and the tappet $b$ at the commencement of the segmental rack $B^{21}$ contacts with it, and in so doing rolls the teeth of the pinion into mesh with the teeth $B^{21}$, by which the said pinion together with the horn and cord-holder are then rotated through a complete revolution.

A knife, L', is mounted upon a bracket, $l$, secured to the inner side of the casing A, and is so formed and adjusted that it may move into the space within the convolutions of the horn K when the latter is at or near its first and last positions, and thereby sever the cord close to the clamp and release the bundle. The knife-arm extends rearwardly and is provided with a projecting roller, $L^2$, which travels in the cam-track $b'$ on the face of the disk $a$ and actuates the knife, as will be readily understood.

Figure 24:
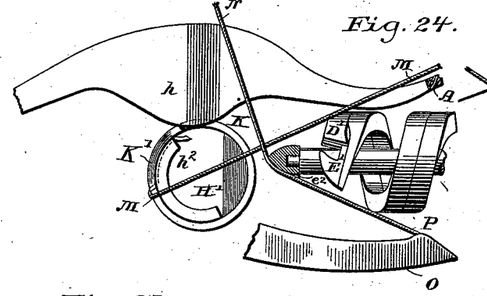
Figs. 24 to 31 are diagrammatic views showing the progressive positions assumed by the parts immediately involved during the several movements incident to the formation of a knot, a more detailed reference to which will be made in the description of the operation of the device.
Figures 25, 26, 29, 30:
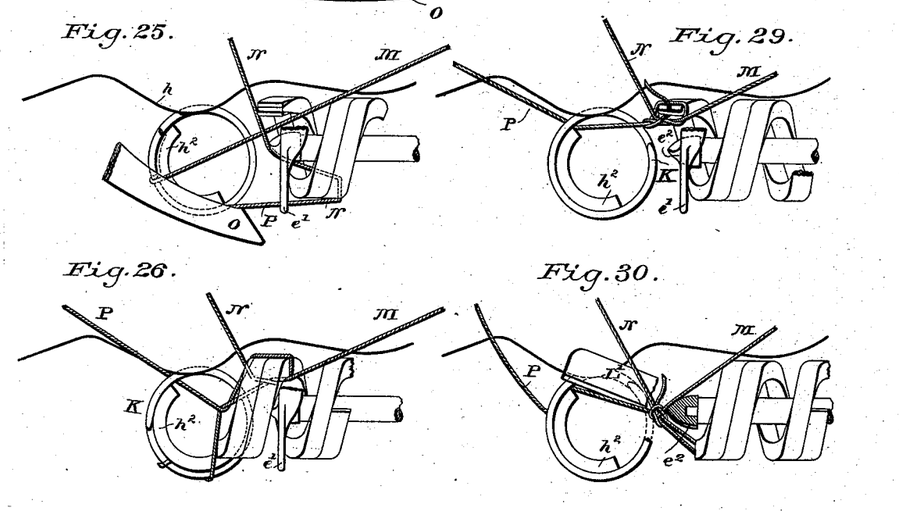
Figure 27:
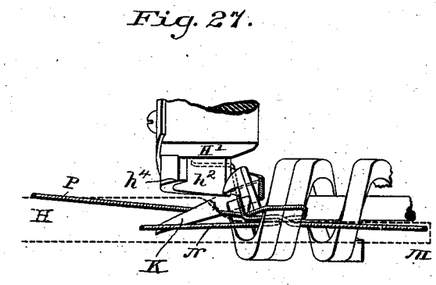
Figure 28:
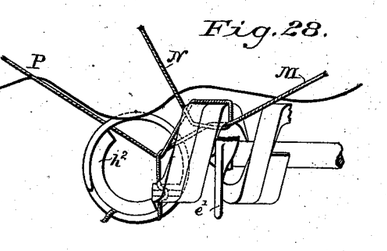
Figure 31:
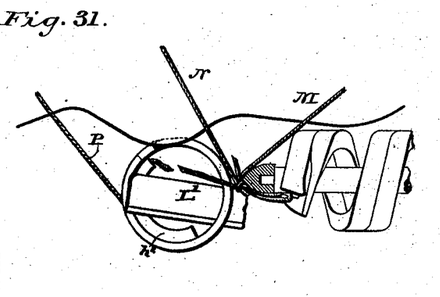
Figure 32:
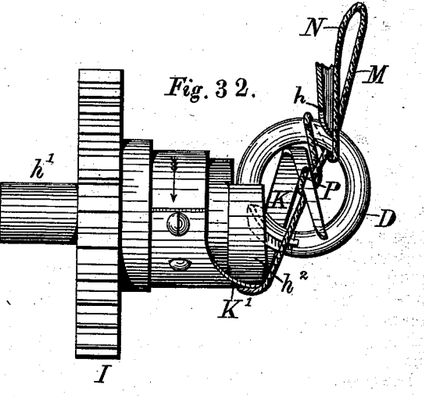
Fig. 32 is an enlarged front elevation showing the cord-holder and a portion of the knotter-spirals in the same position as in the plan view, Fig. 27.
Figure 34:
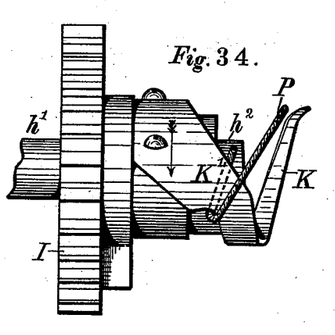
Fig. 34 is an enlarged front elevation of the holder in the same position as in the side elevation, Figs. 31 and 24.

The operation of the device will now be described, beginning with the parts in their first positions, which are substantially those shown in Fig. 24, in which it will be seen that the end of the cord M is clamped between the plate K' and the flange $h^2$. This cord then extends across the horn K, (the point of which is at this time under the edge of the lip $h$,) and then diagonally upward and out through the rear portion of the slot H and around the bundle to be bound, and back by way of N, which is the new cord just brought in by the needle-arm O, and thereby laid across the cord M and in the groove $e^2$. The spiral looper is at this moment in its extreme rearward position of rest, the ends being separated or the jaws opened, as when the loop of the previous knot was released. With the parts in these positions and the gavel ready to be bound, the operation of the tying begins by rotation of the pinion $B^4$, which imparts movement to the cam C, and through it to the spiral looper, forcing it to its extreme forward position and holding it there for a moment with the jaws of the cord-hook D' E' open. As the spiral looper approaches the extremity of its forward movement, the cord-holder is rotated by the engagement of the segmental rack $B^{21}$ on the driving-wheel $a$ with the teeth of the pinion I, the resultant positions being indicated by Figs. 26 and 27, and the cord, which was stationary up to this time, is now by the movement of the holder carried around the circumference of the flange $h^2$ and placed between the separated ends of the double spiral, and then released by the continued rotary movement of the cord-holder mechanism, which carries it off the fixed segment. Just before the cord is entirely released, however, the jaws D' E' are closed upon the cord by the spring $D^3$. The movements of the parts are so timed that the jaws open as the pinion $B^4$, by which the spiral was driven in its forward motion, runs off the rack that drove it and then onto the opposing one, and it is during the pause involved in this change of motion of the spiral that the cord is placed in the open jaws D' E' at the ends of the spirals by the rotating cord-holder prior to the beginning of the reverse movement of the spiral, coincident with which the continued rotation of the cord-holder entirely releases the end of the cord, the bight of which is then carried by the retreating spiral partly through the loop previously formed thereon, as shown in Fig. 29. As the knot is being finished, the continued rotation of the pinion I and the movement of the horn K carries the cord P gradually toward the starting-point until it is caught in the angle $k$ and clamped between the plate K' and the flange $h^2$, at which moment the knife L' is thrown forward and severs the cord between the knotter and the holder. The strain upon the cord, due to the elasticity or expansion of the bundle, is now thrown entirely upon the bight still held by the knotter-jaws, which in their further retreat draw the loop against the bracket $e$ and in position to facilitate its disengagement from them the instant they open at the termination of the retrograde movement and leave the bound bundle free for removal. The cord P, held by the holder and extending to the binder-arm, is then ready to be moved into the position shown at M in Fig. 24 by the next bundle, when by the actuation of the binder-shaft and the descent of the needle-arm the operation of tying is repeated. The cord-holder revolves in one direction only—viz., with the point of the horn K in advance (see arrows in Figs. 32, 33, and 34)—and makes one revolution to each knot. The beginning of its revolution carries the point of the horn K forward and downward from its position close under the edge of the casing. It is thus placed favorably for engaging and retaining the cord P, which is laid under it by the retraction of the binder arm. (See Figs. 26, 27, 28, and 32.) Thus far the horn K takes the place of the cord-controller $p^2$ of my former patent, No. 237,135. The cord P, stretched from the knotter to the retracted binder-arm, passes outside of the orbit of the clamping-plate K', Figs. 27 and 32. The spiral horn K, engaging the cord outside of the orbit of the clamping-plate, by its continued rotation moves the cord laterally into said orbit, Fig. 33, so that the completed rotation of the cord-holder causes the cord to be clamped between the plate K' and the cylindrical segment $h^2$, Fig. 34. The plate K' (as here shown made of spring-steel) is so mounted upon the hub of the pinion I that when opposite the segment $h^2$ it shall press the cord upon the segment with a strong elastic or yielding pressure, thus being adapted to hold firmly cords of varying size. Further security is given to the grip by arranging so that when the cord is being wrapped about the bundle and the severest strain comes upon the grip of the cord-holder the cord draws around the base of the horn in such direction (see cord marked M, Fig. 24) as to pull the plate K' toward the segment $h^2$. Thus increase of strain on the cord is made to increase the pressure on the end of the cord held between the plate K' and the segment $h^2$. The cord-holder is therefore self-adjusting in the strength of its grip at the time of greatest strain on the cord.

Various modifications of the hereinbefore-described devices will be apparent to one skilled in the construction of such apparatus, and I therefore do not wish to be understood as limiting myself to the exact details shown and described, and I may in practice substitute other and well-known mechanical equivalents for some of the elements described and claimed.

The groove $e^2$ in the bracket $e$ is not essential to the practical operation of my improved knotter.

Having thus described my invention, what I claim is—

1. In a knotter, the combination of two parallel spiral arms of unequal length independently mounted upon tubular shanks fitting one within the other and supported on a fixed axis, the longer spiral being extended as a screw-thread upon the exterior of the outer shank, and a stationary block acting against said portion of the longer spiral, whereby the spirals when rotated are caused to move longitudinally upon their axis, substantially as and for the purposes set forth.

2. In a knotter, the combination of a pair of parallel spirals supported upon independent tubular shanks, one within the other, mounted loosely upon a fixed axis, and suitable mechanism adapted to give them a reciprocating longitudinal and rotary motion, substantially as described.

3. In a knotter, the combination of two parallel spirals of unequal length, each attached to a tubular shank, one of which rests within the other, a fixed axis upon which the inner shank is loosely mounted, a spring connecting the shanks, a fixed block acting against one of the spirals, and means for giving a rotary motion to the shanks, substantially as and for the purposes set forth.

4. In a knotter, the combination of two parallel spirals independently mounted upon tubular shanks fitting one within the other, the outer ends of the spirals being formed with a cord-holding hook and recess, respectively, a spring connecting the rear ends of the shanks and acting to hold the hook into the cord-holding recess, a fixed axis upon which the inner tubular shank is loosely mounted, means for positively rotating the inner shank, a stationary block acting against the convolutions of one of the spirals for imparting longitudinal motion thereto, a stud or projection on the exterior shank, and a fixed stop adapted to engage the stud and arrest the movement of the outer shank while the other shank completes its movement and opens the cord-holding jaws, substantially as and for the purposes described.

5. In a knotter, the combination of two parallel spirals, their concentric tubular spring-connected shanks loosely mounted on a fixed axis, the screw-thread extension of one of the spirals upon the surface of the exterior shank, the cam-shell partially enveloping the extended spiral, the stationary block adapted to act against said extension, and means for imparting to the cam-shell a reciprocating rotary motion, substantially as and for the purposes described.

6. In a knotter, the combination of a spiral cord-looping device mounted loosely upon a fixed shaft by means of a tubular shank, a screw-thread upon the surface of the shank having the same pitch as the spiral, a stationary block adapted to act against the spiral to cause it to move longitudinally when rotated, and means for giving to the shank reciprocating rotary motion, substantially as and for the purpose described.

7. In a knotter, the combination of a spiral cord-looping device, a suitable rotary cord-holder, and means for imparting a reciprocating longitudinal and rotary motion to the cord-looping device and an intermittent rotary motion in one direction to the cord-holder, all suitably arranged and adapted to cooperate with each other in the formation of a fish-net knot, substantially as and for the purpose set forth.

8. In a cord-holder, the combination of a fixed segmental clamping-surface, a revolving clamping-plate so mounted concentrically with the segment as on its rotation to pass close to the surface of the segment and press the cord against it with a yielding pressure, and a horn projecting spirally outward from the plate and adapted to hook over and engage the needle end of the cord at the beginning of the revolution of the plate, and by its continued revolution in the same direction to conduct the cord into position to be caught and clamped between the yielding plate and the fixed segment, substantially as and for the purposes described.

9. In a cord-holder, the combination of the fixed segmental clamping-surface, the rotating spiral horn-carrying plate adapted to perform by a single forward revolution all the operations of presenting the cord to the knotter and releasing, engaging, guiding, and clamping it, as described, the mutilated pinion, upon the hub of which the horn-bearing plate is mounted so as to revolve about the axis of the segment, and the segmental gear fixed upon the binder-shaft and adapted to give to the pinion a single rotation at each revolution of the binder-shaft, substantially as described.

10. In a cord-holder, the combination of a fixed segmental clamping-surface, its supporting-post, a pinion mounted to revolve thereon, the plate K', secured to the pinion and extending across the periphery of the segment, and provided with a spirally-extending horn adapted on the rotation of the pinion to engage the cord outside of the orbit of the plate and move it laterally into the orbit of the plate, between which and the segment it is clamped by the continued rotation of the pinion, substantially as described.

11. In a knotter adapted for the formation of a fish-net knot, the combination of the double spiral, constructed as described, the cam for actuating the same, the pinions and driving-wheels for imparting rotary motion thereto, the rotating cord-holder, its driving-wheel mounted on the binder-shaft, and the vibrating knife, also actuated thereby, substantially as and for the purpose described.

12. In a knotter, the combination, with suitable supporting frame-work, of the casing A, the axis $a^5$, secured at its rear end to said casing and supported at its forward end by a depending bracket, and the double-spiral cord-looper mounted loosely upon said axis by its tubular shank, substantially as and for the purpose described.

13. In a knotter, the cord-holder consisting, essentially, of the segmental circular clamping-surface $h^2$ and the intermittently-rotating pinion I, to the hub of which is attached the cylindrical clamping-plate K', provided with the spiral projecting horn K, substantially as described.

14. The combination, with the segmental circular clamping-surface $h^2$, of the revolving elastic clamping-plate K' and the spiral projecting horn K, formed in one piece with the clamping-plate, substantially as described.

15. The combination, with the cord-looping jaws, of the cord-holder consisting of a rotating spiral horn and a fixed segment against which the cord is clamped by the projecting base or heel of the horn, continued rotation of which carries the cord into the open looping-jaws as it passes off the segment and is released by the holder, substantially as described.

16. The combination, with the knotter-casing formed with the lip or guard $h$, of the rotating cord-holder having the spiral cord-guiding horn K, adapted to pause beneath and be protected or shielded by the lower edge of the said lip, substantially as shown and described.

17. The combination, with the stud $h'$, hub H', having recess $h^3$, and the circular segmental clamping-surface $h^2$, of the pinion I, having clamping-plate K', provided with spiral projecting horn K attached thereto, substantially as and for the purposes set forth.

18. The combination, with the knotter-casing formed with the lip or guard $h$, of a vibrating knife and a bracket attached to the casing and adapted to support said knife, with its blade behind and protected by the lip $h'$, substantially as shown and described.

19. The combination of the knotter-casing formed with a lip or guard, $h$, with the rotating cord-holder having the spiral cord-guiding horn K, adapted to rest behind and be protected by the lip $h$, and the vibrating knife mounted as described and located behind the guard and adapted to move during its cutting-stroke between the convolution of the spiral horn, as shown and described.

20. The combination of a knotter and a cord-holder consisting of a fixed segment and a rotating plate provided with an extending spiral cord-guiding horn, with a vibrating knife mounted as described and adapted to move during its cutting-stroke between the convolutions of the spiral horn, as set forth.

21. In combination with the cord-looping devices of a knot-tyer, a cord-holder consisting, essentially, of a circular segmental clamping-surface and a revolving clamping-plate provided with a spiral projecting horn or cord-hook arranged to revolve about an axis at or nearly at right angles with the plane of the vibration of the binder-arm, whereby the engagement of the cord by the rotation of the hook is secured, substantially as and for the purposes set forth.

22. The combination, in a cord-holder, of the cylindrical segmental clamping-surface $h^2$, having its outer edge beveled, as at $h^4$, and the revolving clamping-plate K', provided with spiral projecting cord-hook K, substantially as described.

In testimony whereof I hereto affix my signature in presence of two witnesses.

JAMES R. SEVERANCE.

Witnesses:
H. S. BUCKLAND,
JAMES H. FOWLER.